(No Model.)

C. E. ASHCROFT.
PRESSURE GAGE TESTING APPARATUS.

No. 295,093. Patented Mar. 11, 1884.

WITNESSES
Helen M. Feegan
William Edson

INVENTOR
Chas. E. Ashcroft

UNITED STATES PATENT OFFICE.

CHARLES E. ASHCROFT, OF LYNN, MASSACHUSETTS.

PRESSURE-GAGE-TESTING APPARATUS.

SPECIFICATION forming part of Letters Patent No. 295,093, dated March 11, 1884.

Application filed August 31, 1883. (No model.)

*To all whom it may concern:*

Be it known that I, CHARLES E. ASHCROFT, of Lynn, in the county of Essex and State of Massachusetts, have invented a certain new and useful Improved Pressure-Gage-Testing Apparatus, of which the following is a specification.

My invention relates to a device for testing pressure-gages by means of absolute weight, the measure of weight being determined by standard weights, the object being to furnish to users of engines a reliable testing apparatus of simple construction, which may be used at any time for ascertaining the correctness of the steam-gage. I attain this object by the mechanism illustrated in the accompanying drawings, in which—

Figure 1:
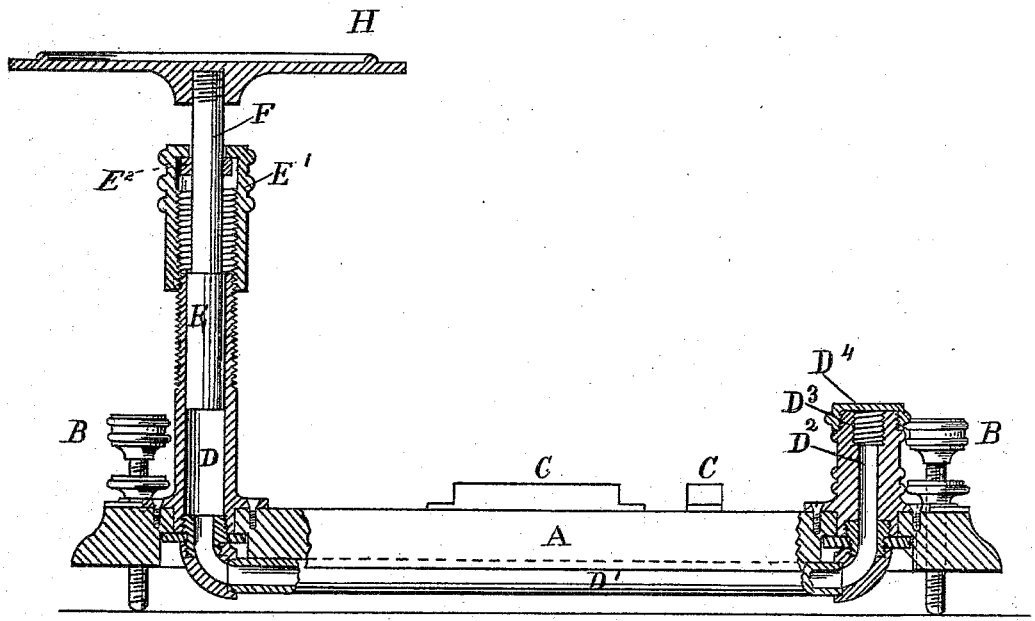
Figure 2:
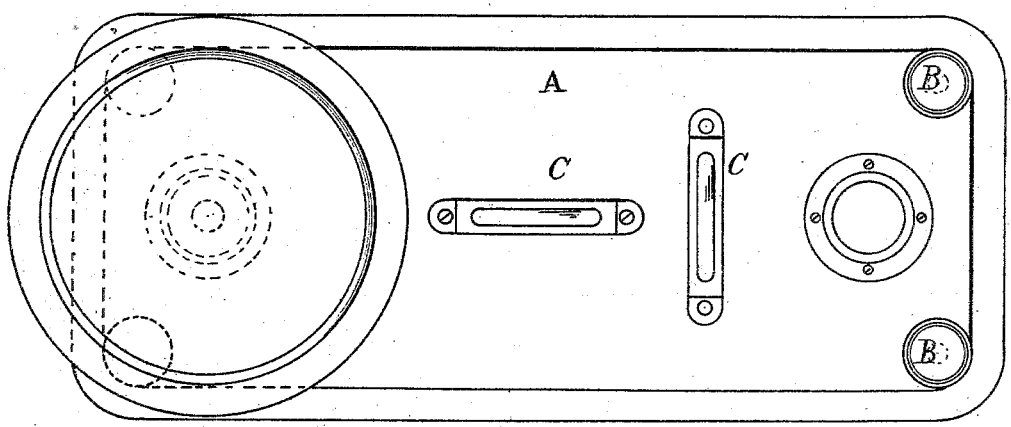

Figure 1 is a longitudinal vertical section, and Fig. 2 is a plan.

In the drawings, A represents the base, to which I attach my instrument. This base may be of any suitable material, and is supplied with leveling-screws B B B B and with spirit-levels C C, so that the user can adjust the instrument as desired.

D is a vertical cylinder, into which a piston, E, fits accurately, but yet with the smallest possible amount of friction, the said piston E having a rod, F, which terminates in a weight-disk, H, and is provided with a fixed ring, $E^2$, which, in connection with the screw-thimble $E'$, serves as a check to limit its upward movement.

$D'$ is a horizontal tube, which serves to connect the cylinder D with the upright $D^2$. The upper end of $D^2$ is provided with an internal screw, $D^3$, which serves as a convenient device for attaching the gage to be tested.

$D^4$ is a cap to be used to protect the fluid within the apparatus when not in use.

For transmitting the pressure exerted on fluid by the piston E to the gage affixed to the part $D^2 D^3$, I use glycerine, as that is a fluid at all ordinary temperatures, and is a perfect lubricant for the cylinder and piston.

To make my invention practical it is necessary that the area of the piston D shall bear some definite ratio to a square inch, so that the pressure per square inch may be calculated. A convenient piston is one having an area of one-fourth of a square inch, in which case each pound-weight upon the weight-disk H will measure four pounds of pressure upon the gage.

In my device, in its simplest form, as shown in the drawings, it is necessary to allow for the weight of the piston E, rod F, and weight-disk H, which, in case the piston has an area of one-fourth of an inch, should be made to weigh one and one-fourth pound, so as to exert a pressure equal to five pounds per inch as measured by the gage.

For testing-gages for slight pressures the weight of the piston, piston-rod, and disk may be counterbalanced by any of the well-known devices for this purpose.

To use my device I proceed as follows: The apparatus is placed upon any firm table and adjusted by the leveling-screws B, so that the cylinder D shall be vertical. Now, fill the apparatus with glycerine and attach the gage to be tested to the part $D^2 D^3$. The piston E, which must be perfectly clean, is inserted into the cylinder D, and its weight, if made as above described, should cause the gage to indicate a pressure of five pounds. The weights are then gently placed upon the disk H and the piston each time rotated, in order to free it from adhesive friction and to get the best results.

In testing extreme pressures a cock may be placed under the gage to be tested, for the purpose of holding the pressure prevailing at the time. Should the testing-piston come in contact with the bottom of the cylinder, this cock may be closed, the piston withdrawn, having first removed the weights from the tray, and a further supply of glycerine poured into the testing-cylinder. When this is done, the piston is reinserted and the same number of weights placed upon the tray as before. In this way very high pressures can be obtained. When the testing or dividing of the dial is finished, the weights are removed, and the piston withdrawn. When the gage-hand arrives at zero, the cock may be closed and the gage that has been tested unscrewed.

I claim—

In a pressure-gage-testing apparatus, the combination of the weight-disk H, piston E, and cylinder D with the tube $D' D^2$ and coupling-joint $D^3$, operating substantially as described, and for the purpose set forth.

CHARLES E. ASHCROFT.

Witnesses:
HELEN M. FEEGAN,
WILLIAM EDSON.